United States Patent [19]
Ono et al.

[11] Patent Number: 5,179,272
[45] Date of Patent: Jan. 12, 1993

[54] CARD READING DEVICE HAVING CARD ORIENTATION CORRECTION MECHANISM

[75] Inventors: Yoshiaki Ono; Makoto Takahashi, both of Shizuoka, Japan

[73] Assignee: Tokyo Electric Co., Ltd., Tokyo, Japan

[21] Appl. No.: 540,340

[22] Filed: Jun. 19, 1990

[30] Foreign Application Priority Data

Jun. 22, 1989 [JP] Japan .................. 1-160162

[51] Int. Cl.⁵ .................. G06K 13/63; G06K 13/8; B65H 29/00
[52] U.S. Cl. .................. 235/476; 235/475; 235/480; 271/186
[58] Field of Search ............ 271/186; 235/475, 477, 235/480, 476

[56] References Cited

U.S. PATENT DOCUMENTS

| | | | |
|---|---|---|---|
| 3,641,931 | 2/1972 | Hickox et al. | 271/64 |
| 4,019,435 | 4/1977 | Davis | 271/186 X |
| 4,549,661 | 10/1985 | Morishita et al. | 271/186 X |
| 4,613,747 | 9/1986 | McCarthy | 235/477 X |
| 4,625,870 | 12/1986 | Nao et al. | 271/186 X |
| 4,711,443 | 12/1987 | Fujiwara et al. | 271/126 |
| 4,784,289 | 11/1988 | Ogawa et al. | 221/9 |
| 4,866,256 | 9/1989 | Morofushi | 235/433 |

FOREIGN PATENT DOCUMENTS

| | | |
|---|---|---|
| 132393 | 1/1985 | European Pat. Off. . |
| 2115171 | 3/1970 | Fed. Rep. of Germany . |
| 1508598 | 1/1967 | France . |
| 1165140 | 12/1966 | United Kingdom . |

OTHER PUBLICATIONS

Patent Abstracts of Japan, vol. 9, No. 170 (P-373) (1893), Jul. 16, 1985, Japanese 60045889 (Nippon Denki K.K.).

Primary Examiner—Eugene R. Laroche
Assistant Examiner—Christopher R. Glembocki
Attorney, Agent, or Firm—Frishauf, Holtz, Goodman & Woodward

[57] ABSTRACT

A reading device includes an inlet port for a boarding pass, a reading section for reading data recorded on part of the boarding pass, and a feeding section for transporting a boarding pass from the inlet port to the reading section. The reading device further includes a rotating section for holding a boarding pass fed thereto and rotating together with the boarding pass, and a control circuit for checking the orientation of the boarding pass inserted into the inlet port, and instructing the feeding section to temporarily feed the boarding pass to the rotating section and instructing said rotating section to turn over the boarding pass when it is detected that the boarding pass has been inserted in a particular incorrect orientation.

10 Claims, 14 Drawing Sheets

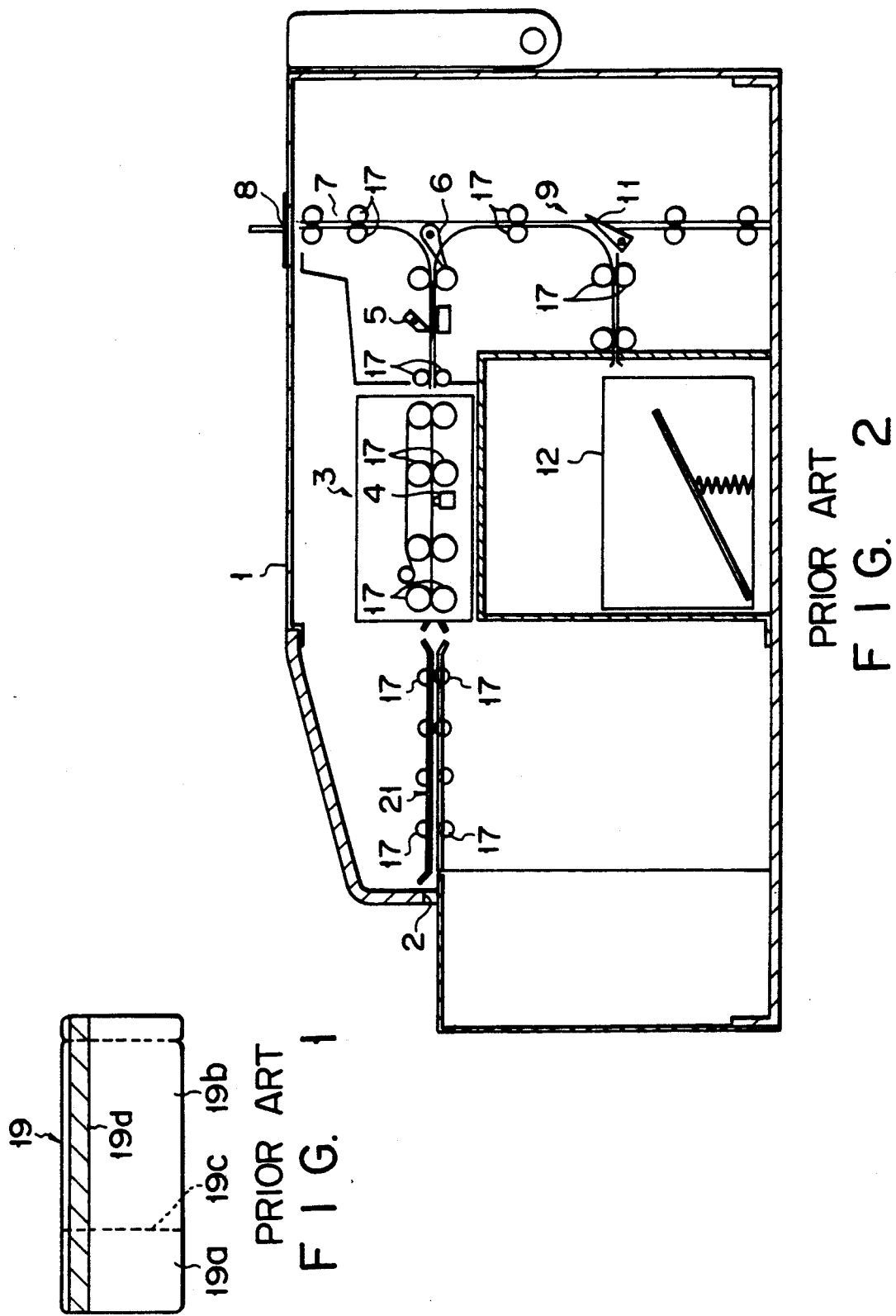

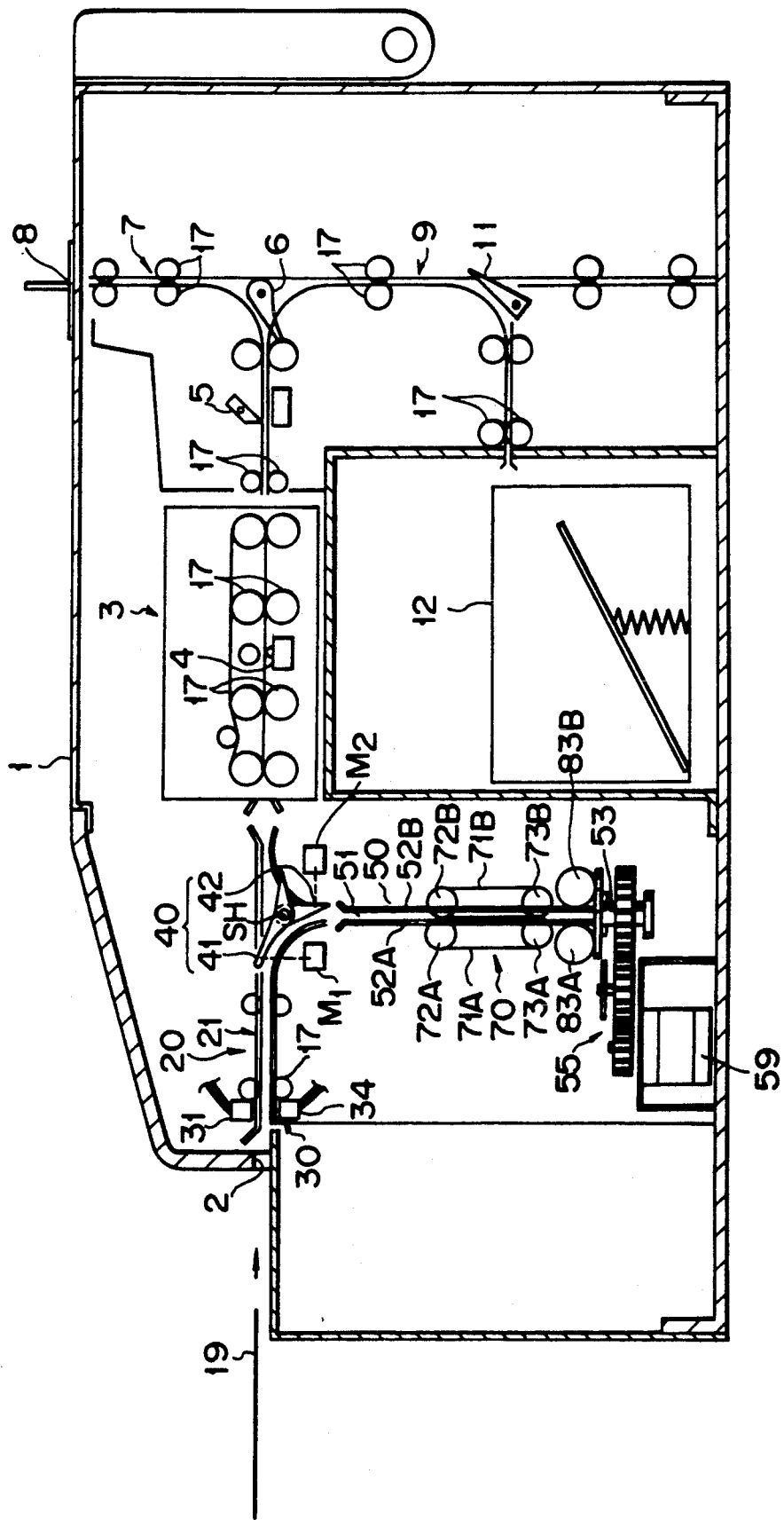

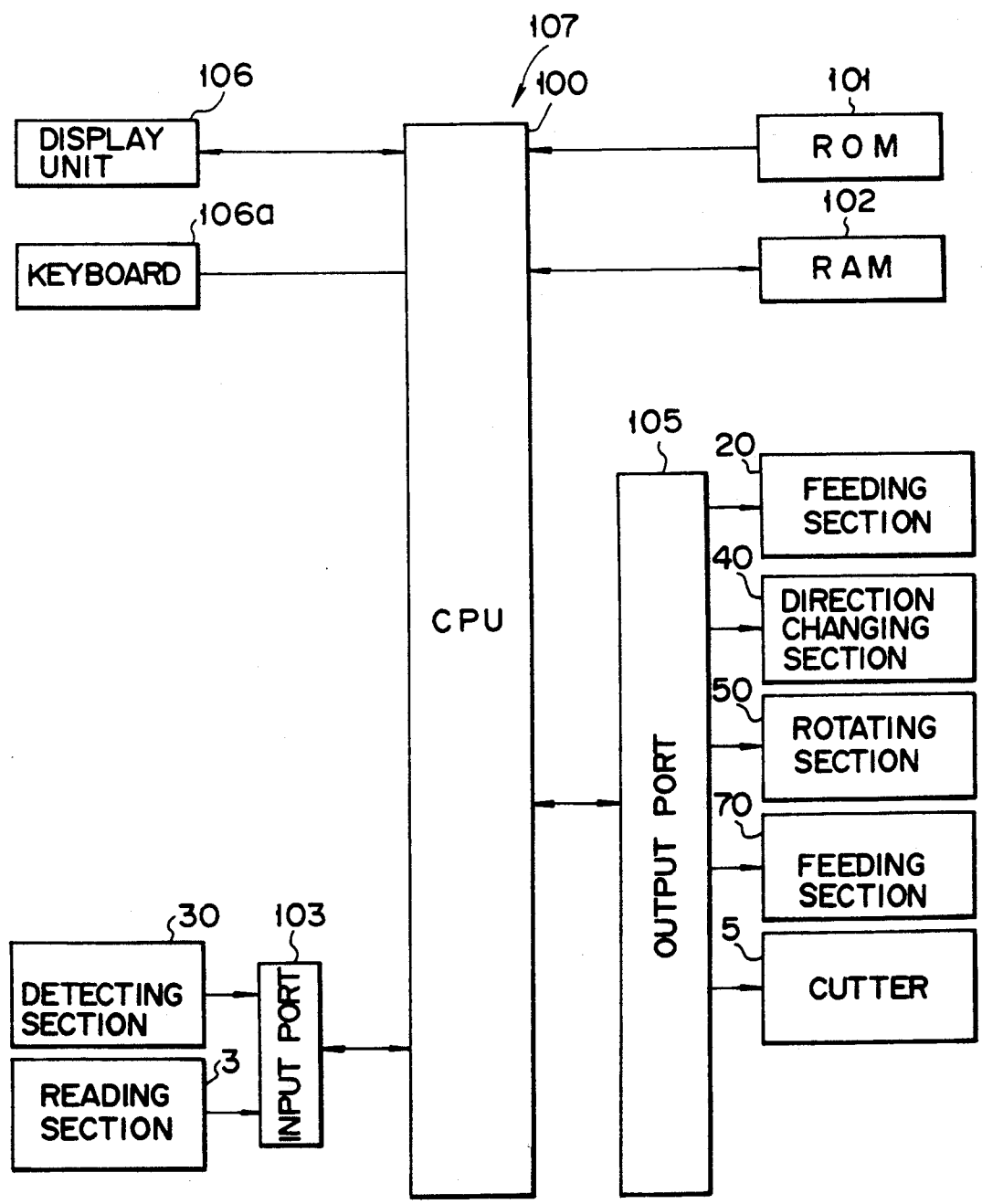
F I G. 4

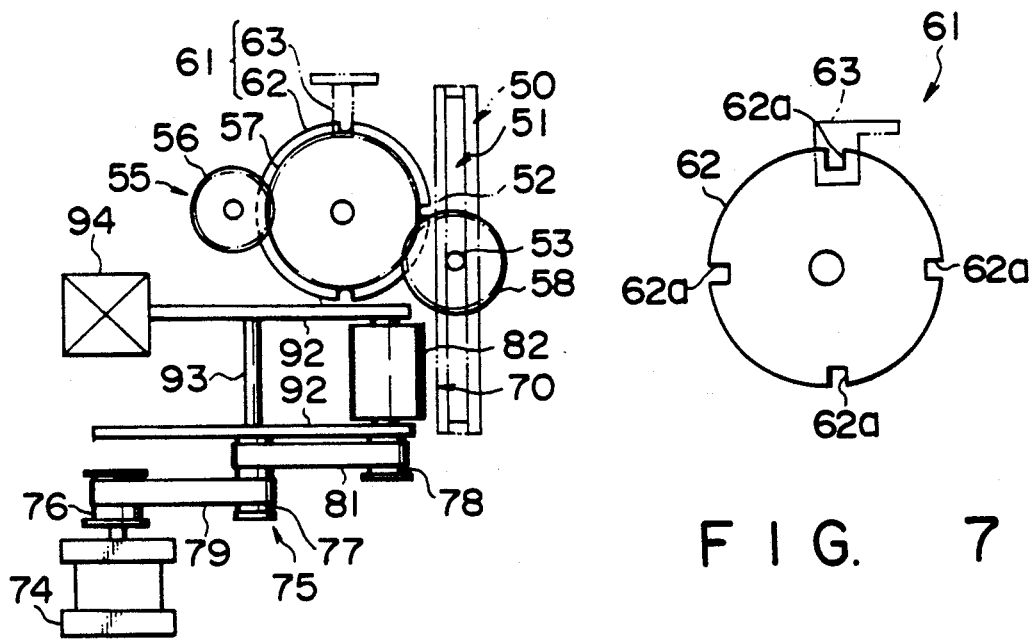
FIG. 6
FIG. 7
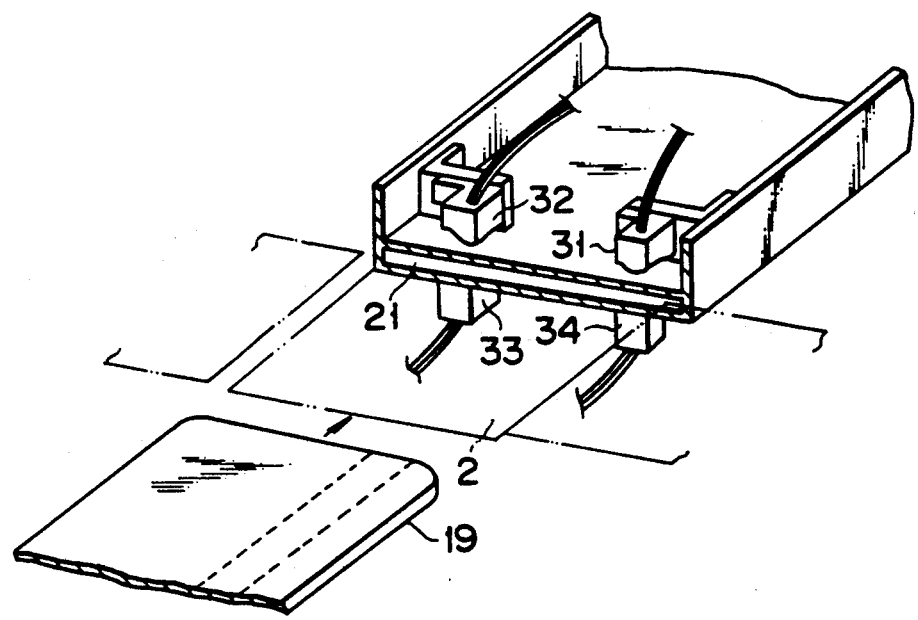
FIG. 8

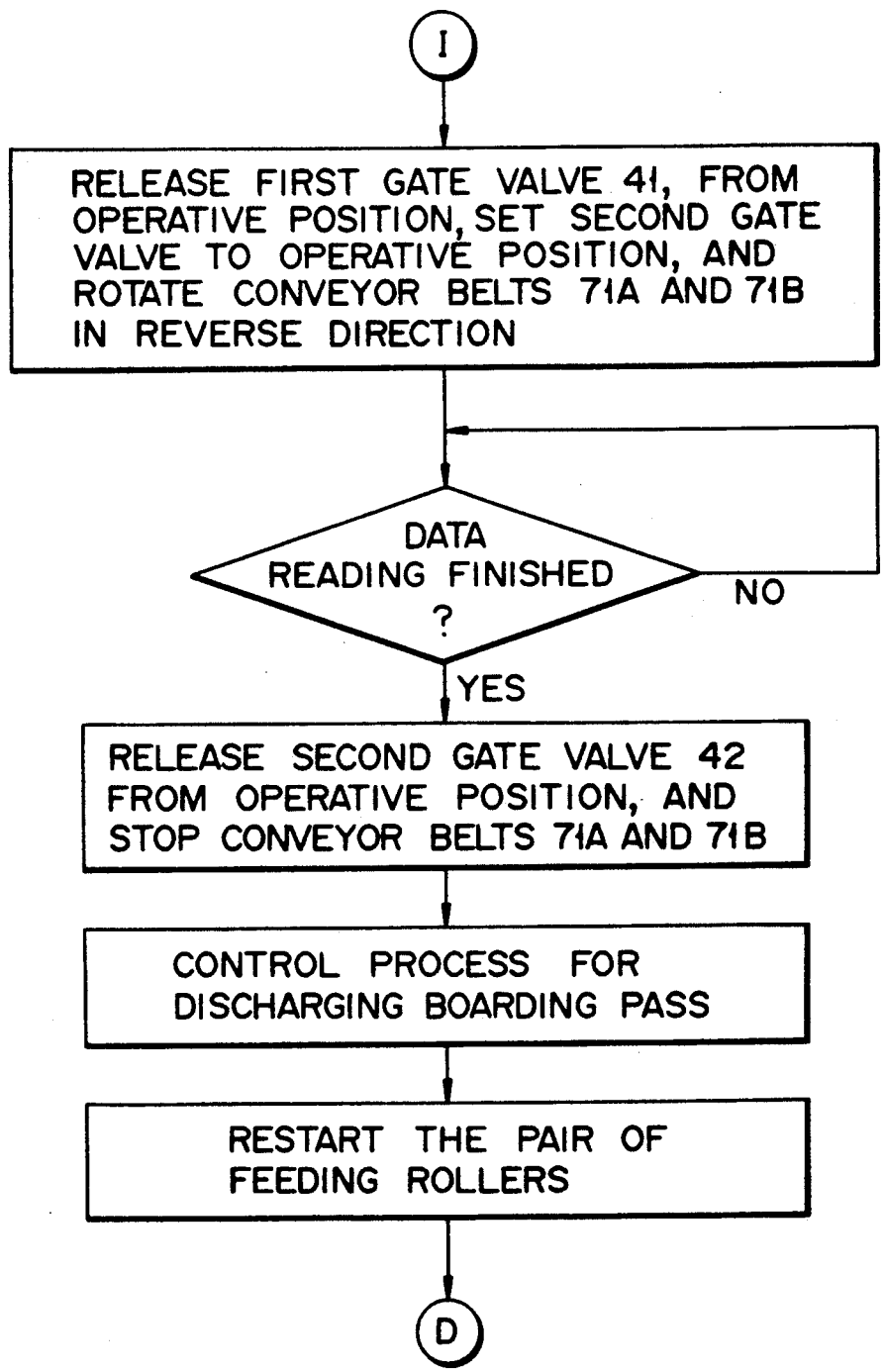
F I G. 10H

CARD READING DEVICE HAVING CARD ORIENTATION CORRECTION MECHANISM

BACKGROUND OF THE INVENTION

1. Field of the Invention

This invention relates to a reading device for reading data recorded on a card such as a boarding pass.

2. Description of the Related Art

Before boarding the plane, the passenger inserts his boarding pass into a reading device located at the boarding gate. Then, the reading device reads data recorded on the boarding pass and confirms the passenger's name and seat number/vacancy.

FIG. 1 shows the layout of a normal boarding pass. The boarding pass 19 has a passenger's stub 19a and an airline-retained portion 19b which are separated along a cut-off line 19c at the time of boarding. A magnetic stripe 19d is formed on the reverse side of the boarding pass 19 and extends in the lengthwise direction thereof. Data, including the name of the passenger, the seat number and the like, are recorded on the magnetic stripe when the boarding pass 19 is issued.

FIG. 2 schematically shows the internal structure of a reading device for reading data on boarding passes. The reading device has an inlet port 2 on the front portion thereof. The boarding pass 19 is inserted into the inlet port 2 in the correct orientation, i.e. face up with the airline-retained portion 19b preceding the passenger's stub 19a. The inlet port 2 has predetermined dimensions to guide the inserted boarding pass into the internal portion.

After insertion, the boarding pass 19 is fed from the inlet port 2 to a reading section 3 by means of feeding rollers 17 which are disposed along a feeding path 21.

The reading section 3 has a reading head 4 for reading data recorded on the magnetic stripe 19d of the boarding pass 19 fed thereto. The reading head 4 is formed with extremely high precision and functions to read recorded data from the boarding pass 19 when the boarding pass 19 is fed thereto with the correct orientation maintained.

After the reading operation, the boarding pass 19 is fed to a cutter 5. The cutter 5 cuts the boarding pass 19 along the cut-off line 19c so as to separate the boarding pass 19 into the passenger's stub 19a and airline-retained portion 19b. Subsequently, the airline-retained portion 19b is guided to a collection path 9 selected by a gate valve 6 and is then received by a hopper 12 via a gate valve 11. Meanwhile, the passenger's stub 19a is guided to a return path 7 selected by the gate valve 6 and discharged from an outlet port 8. The passenger then picks up the discharged passenger's stub 19a of the boarding pass and boards the plane.

When inserting the boarding pass 19 into the inlet port 2, the boarding pass 19 may be inserted in an incorrect orientation (for example, the passenger's stub of the boarding pass 19 is set forward or the reverse side thereof is set upward) and accepted by the reading device. When the boarding pass 19 is conveyed to the reading section 3, the reading head 4 cannot read data recorded on the magnetic stripe 19d since the magnetic stripe 19d does not face the reading head 4. Therefore, it is necessary to re-insert the pass 19 into the card inlet port 2 in the correct orientation.

If such a case arises, a problem may occur in the boarding procedure if a large number of boarding passes 19 must be checked in an extremely short time. For example, even if a person who is good at handling the reading device is placed in charge and stationed to receive the boarding passes 19 from the passengers one after another and insert them into the card inlet port 2 one at a time, there is still a possibility that the may insert a boarding pass with the front side facing down. Of course, this problem may more frequently occur when into the inlet port 2 under instructions from the person in charge.

In order to solve the above problem, the construction of a reading device is herein considered, in which data can be read irrespective of the orientation of the boarding pass 19 at the point of insertion. More specifically, four reading heads 4 are used, two of them disposed above the boarding pass 19 in the width direction thereof and the remaining two heads disposed below the boarding pass 19 in the width direction thereof. With this arrangement, data can be correctly read even when the boarding pass is inserted with the wrong side set upward or the rear end set forward.

However, when the reading device 3 is constructed occur:

(1) The manufacturing cost of the reading device becomes higher with an increase in the number of reading heads 4 which are very precise parts and consequently expensive. (2) The arrangement of the four reading heads 4 is determined according to the position of the magnetic stripe of the boarding pass 19 and cannot be freely changed. As a result, it becomes difficult to reduce the overall size of the reading device. (3) The positions of the four reading heads 4 must be separately and precisely adjusted in order to correctly read data even if troublesome. (4) Further, in order to operate the four reading heads 4 and read data on the boarding pass 19, a special treatment must be made in order to compensate for differences between the characteristics of each head.

SUMMARY OF THE INVENTION

The object of this invention is to provide a reading device which can be made small and manufactured at a low cost and which can correctly read data recorded on a card even when the card is inserted in a particular incorrect orientation.

The above object can be attained by a reading device which comprises a card inlet to which a card is inserted; a reading section for reading data recorded on the card; a transport section for transporting the card from the card inlet to the reading section; a rotation mechanism for storing the card supplied thereto during transport, and rotating together with the card; and a control circuit for checking the orientation of the card inserted into the card inlet, and for instructing both the transport section to temporarily feed the card to the rotation mechanism and the rotation mechanism to turn the card over when it is detected that the card has been inserted in a particular incorrect orientation.

According to the above reading device, even if the card is inserted into the card inlet in a particular incorrect orientation, the orientation of the card can be corrected by means of the rotation mechanism before the card is fed to the reading section. The rotation mechanism can be operated by a simple control as well as the transport section, to turn over the card temporarily supplied to the mechanism during transport. Further, this mechanism can be modified into a configuration suitable for miniaturization of the reading device without entailing strict limitations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a plane view showing the rear face of a normal boarding pass;

FIG. 2 is a cross sectional diagram showing the internal structure of a conventional reading device;

FIG. 3 is a cross sectional diagram showing the internal structure of a reading device according to one embodiment of this invention;

FIG. 4 is a block diagram showing a circuit of the reading device shown in FIG. 3;

FIGS. 5 and 6 are respectively a perspective view and a plan view showing the construction of a rotation section shown in FIG. 3 in detail;

FIG. 7 is a diagram showing the positional relation of a photosensor and the rotatable plate shown in FIG. 6;

FIG. 8 is a perspective view showing the arrangement of a magnetic sensor in a detecting section shown in FIG. 3;

FIGS. 10A to 10H are flowcharts showing the operation of the reading device of the embodiment.

DETAILED DESCRIPTION OF THE PREFERRED EMBODIMENT

Figure 5:
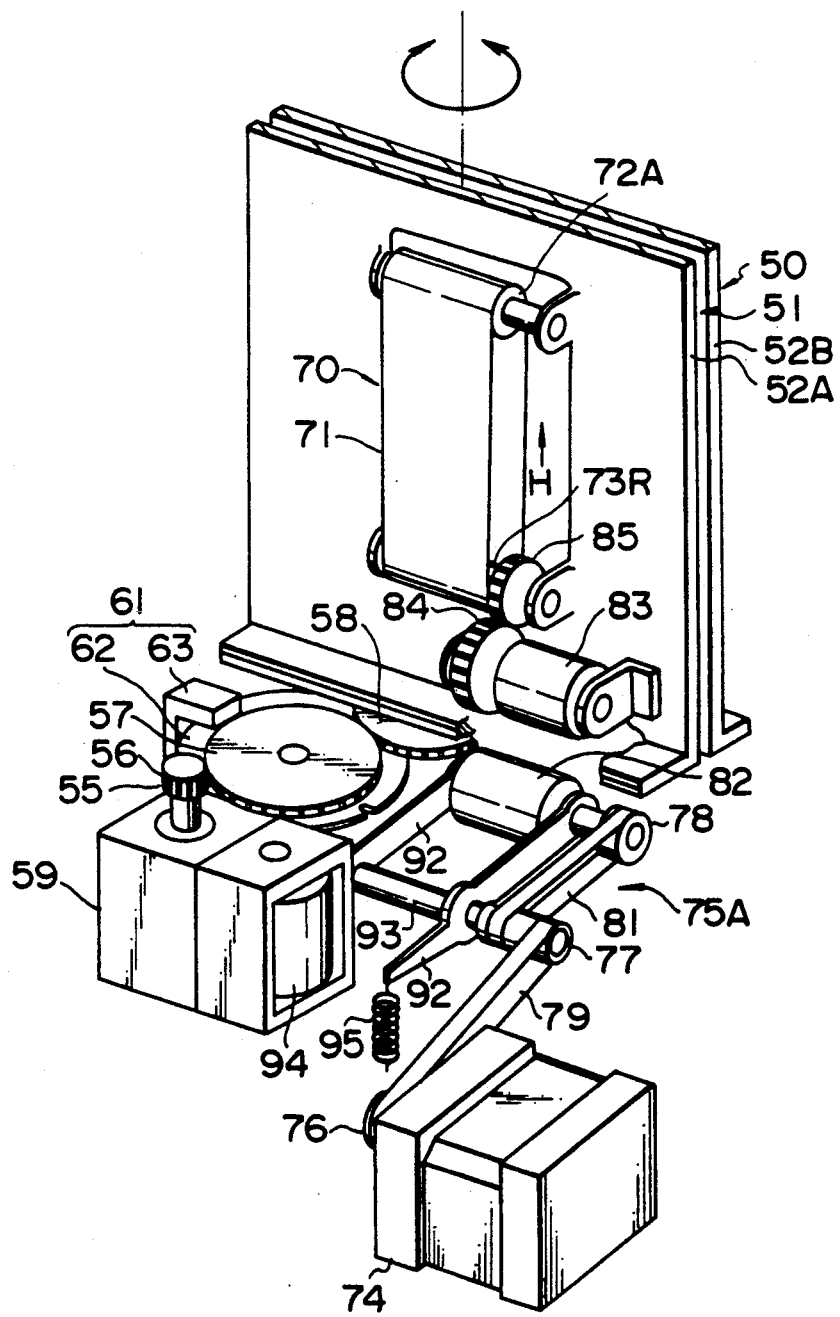

A reading device for reading boarding passes according to one embodiment of this invention will now be described with reference to FIGS. 3 to 10H.

FIG. 3 schematically shows the internal structure of the reading device. As with the conventional reading device, the reading device includes an inlet port 2 for insertion of boarding passes 19, a reading section 3, a cutter 5 and an outlet port 8. The reading device further includes a main feeding section 20, detecting section 30, direction changing section 40, rotating section 50, sub-feeding section 70 and control circuit 107.

Portions which are the same as those shown in FIG. 2 are denoted by the same reference numerals, and explanation thereof is omitted or simplified.

The reading section 3 includes a single reading head 4 which is arranged to read data recorded on the magnetic stripe of a boarding pass 19 as it is being transported.

FIG. 4 shows the construction of the control circuit. The control circuit includes a CPU 100, ROM 101 and RAM 102 for controlling the entire portion of the reading device. The ROM 101 stores a control program for the CPU 100, and the RAM 102 temporarily stores input/output data of the CPU 100. In an initializing process, various work registers (e.g., flag registers and counter registers) are provided in the RAM 102. The detecting section 30 and reading section 3 are connected to the CPU 100 via an input port 103. Further, the CPU 100 is connected to the feeding section 20, direction changing section 40, rotating section 50, sub-feeding section 70, cutter 5 and feed rollers 17 via an output port 105. In addition, the CPU 100 is connected to a display unit 106 and a keyboard 106a.

As shown in FIG. 3, the feeding section 20 serves to feed the boarding pass inserted into the inlet port 2 and to the reading section 3. The feeding section 20 is constituted by a feeding path 21 and the feeding rollers 17 disposed thereon.

The detecting section 30 serves to detect the magnetic stripe of the inserted boarding pass 19, and as shown in FIG. 8, it has four magnetic sensors 31, 32, 33 and 34 disposed at the entrance of the feeding path 21, sensors 31 and 34 spaced a preset distance from sensors 32 and 33 in the width direction of the feeding path 21 with a preset distance and with the feeding path 21 positioned between sensors 31 and 32 and sensors 33 and 34. When the boarding pass 19 shown in FIG. 1 is inserted into the inlet port 2, that one of the four magnetic sensors 31 to 34 which faces the magnetic stripe 19d thereof generates a detection signal. The detection signal is supplied to the CPU 100 via the input port 103. The CPU 100 repeatedly checks the presence of the detection signal supplied from one of the magnetic sensors 31 to 34 so as to detect the insertion, rear edge, and orientation of the boarding pass 19.

The direction changing section 40 serves to remove the pass 19 from the feeding path 21 when the boarding pass 19 is detected as having been inserted in a particular wrong orientation. The direction changing section 40 is constituted by first and second solenoids M1 and M2, and first and second gate valves 41 and 42 rotatably mounted on a shaft SH extending in the width-wise direction of the feeding path 21 and respectively coupled to the plungers of the first and second solenoids M1 and M2. The solenoids M1 and M2 are controlled by CPU 100 through the output port 105 so as to change the angles of the first and second gate valves 41 and 42. The first and second solenoids M1 and M2 are normally maintained at a rest position which is separated from the operative position by a preset angle in the counterclockwise direction. The first and second solenoids M1 and M2 are respectively energized to set the first and second gate valves 41 and 42 to the operative position. The energization is interrupted to release the gate valves 41 or 42 from the operative position to the rest position.

When the first gate valve 41 is set at the operative position as shown in FIG. 3, the upstream side of the feeding path 21 is coupled to a sub-feeding path 51. When the first gate valve 41 is set at the rest position, the upstream side of the feeding path 21 is separated from the sub-feeding path 51.

When the second gate valve 42 is set at the rest position as shown in FIG. 3, the downstream side of the feeding path 21 is separated from the sub-feeding path 51, and when the second gate valve 42 is set at the operative position which is separated from the rest position by a preset angle in the clockwise direction, the downstream side of the feeding path 21 is coupled to the sub-feeding path 51.

The rotating section 50 serves to rotate the boarding pass 19 which is removed from the feeding path 21 around an axis extending in the feeding direction of the pass 19 so as to turn the boarding pass 19 over. As shown in FIG. 5, the rotating section 50 includes two paper guides 52A and 52B, gear train 55, driving motor 59 and positioning section 61.

The paper guides 52A and 52B are disposed facing each other with a preset distance therebetween, defining the sub-feeding path 51. As shown in FIG. 6, the paper guides 52A and 52B are so formed as to rotate around a rotation axis 53. The paper guides 52A and 52B are driven by the driving motor 59 through the gear train 55. The gear train 55 is constructed of a gear 56 mounted on the shaft of the driving motor 59, a gear 57 engaged with the gear 56 and a gear 58 which is engaged with the gear 57 and has the same number of teeth as the gear 57. The gear 58 rotates around a rotation axis 53, and the paper guides 52A and 52B are disposed over the gear 58.

The positioning section 61 serves to detect the amount of rotation of the paper guides 52, and is constituted by a rotatable plate 62 mounted on the gear 57 and a photosensor 63. As shown in FIG. 7, cut-away portions 62a are formed at regular intervals of 90 degrees in the rotatable plate 62, and the photosensor 63 is placed so as to be in alignment with each of the cut-away portions 62a.

When the driving motor 59 of the rotating section 50 is driven to rotate the paper guides 52A and 52B, the rotatable plate 62 is also rotated. Then, as shown in FIG. 7, when the cut-away portion 62a of the rotatable plate 62 comes into alignment with the photosensor 63, a signal is output from the sensor 63 and supplied to the CPU 100 via the output port 105. The CPU 100 detects the amount of rotation of the paper guides 52A and 52B based on the received signal and controls the driving motor 59 so as to rotate the paper guides 52A and 52B by a preset rotation amount which is necessary to turn over the boarding pass 19.

The sub-feeding section 70 serves to set the boarding pass 19 into the sub-feeding path 51 and then return the boarding pass 19 to the feeding path 21, and comprises two sets of conveyor belts 71A and 71B and power transmission devices 75A and 75B.

As shown in FIGS. 3 and 5, the conveyor belts 71A and 71B are endless belts for carrying the boarding pass 19 while holding it therebetween. The conveyor belt 71A is stretched over the rollers 72A and 73A disposed on the side of the paper guide 52A so as to travel therebetween. Likewise, the conveyor belt 71B is stretched over the rollers 72B and 73B disposed on the side of the paper guide 52B so as to travel therebetween.

The power transmission mechanism 75 serves to selectively transmit the driving force of the driving motor 74 to one of the conveyor belts 71A and 71B, and is constituted by pulleys 76, 77 and 78, timing belts 79 and 81, driving roller 82, driven rollers 83A and 83B, gears 84 and 85, holders 92 and solenoid 94.

One pulley 76 is mounted on the shaft of the driving motor 74, another pulley 77 is rotatably mounted on a supporting shaft 93, and the remaining pulley 78 is mounted on the driving roller 82. The timing belt 79 is stretched between the pulleys 76 and 77, and the timing belt 81 is stretched between the pulleys 77 and 78.

The holders 92 are mounted rotatably around the supporting shaft 93. The left side ends of the holders 92 in FIGS. 5 and 6 are engaged with the solenoid 94 so as to be rotated thereby. Further, the driving roller 82 is rotatably mounted on the right side ends of the holders 92 in the drawings and can be selectively set in friction contact with one of the driven rollers 82A and 83B. The driven rollers 83A and 83B are rotatably mounted on the paper guides 52A and 52B, respectively. Further, a compression spring 95 is connected to one of the holders 92 which is located on the left-hand side in FIG. 5 so as to bias the holder 92 in the counterclockwise direction.

When the solenoid 94 is energized to rotate the holders 92 in the counterclockwise direction, the driving roller 82 and the driven roller 83A or 83B are set into friction contact with each other. Therefore, the driving force of the driving motor 74 is transmitted to one of the conveyor belts 71A and 71B via the power transmission mechanism 75 to move the belts 71A and 71B in a direction indicated by an arrow H. As a result, the boarding pass 19 set inside the sub-feeding path 51 is picked up by means of the conveyor belts 71A and 71B and returned to the feeding path 21 via the second gate valve 42 set in the operative position.

The CPU 100 of the control section 107 performs a control operation for the elements 20, 30, 40, 50 and 70 by executing the control program stored in the ROM 101. In this control operation, the orientation of the boarding pass 19 is corrected if it has been inserted in an incorrect orientation so that the boarding pass 19 can be supplied in a correct orientation to the reading section 3.

Next, the operation of the reading device will be explained with reference to FIG. 9 and FIGS. 10A to 10H.

Figure 9:
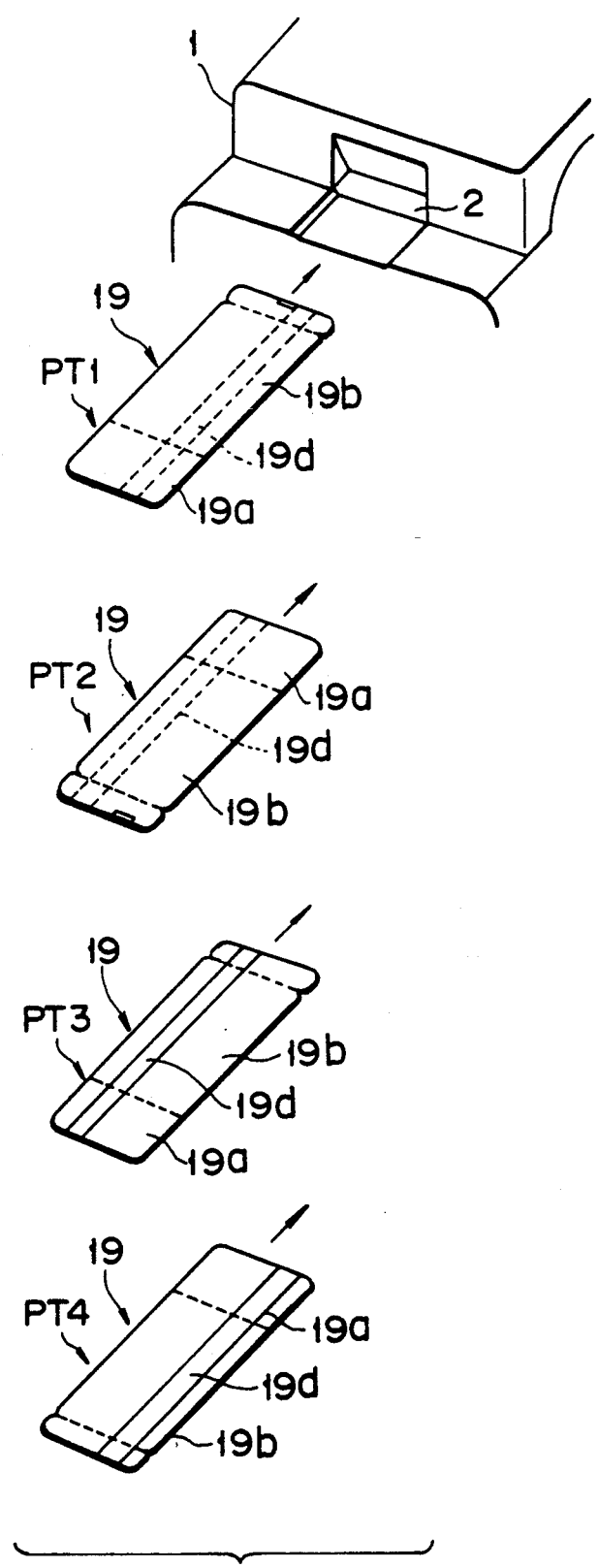
FIG. 9 is a diagram illustrating the orientations of the boarding pass to be inserted to the inlet port shown in FIG. 3.
Figure 10A:
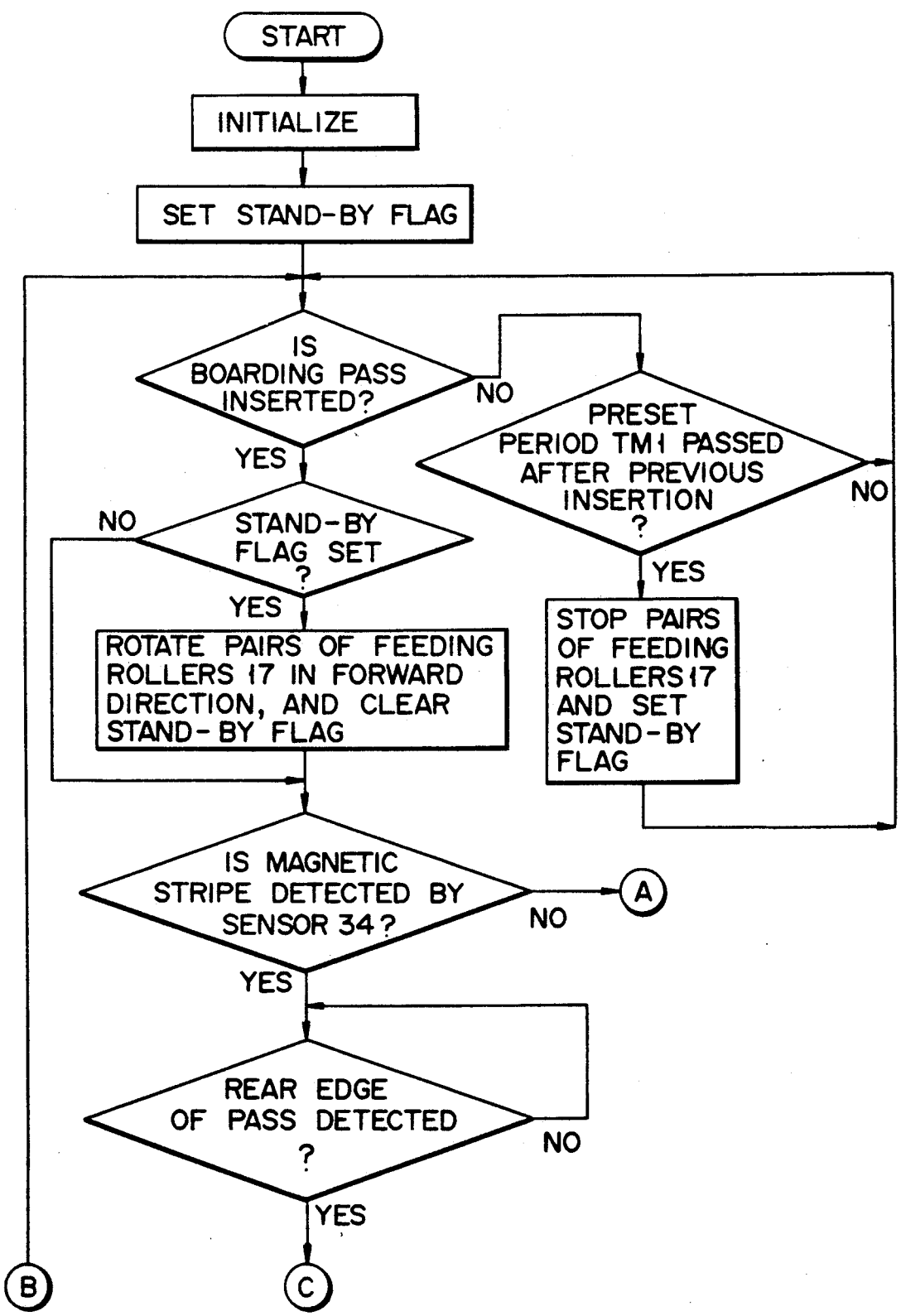
Figure 10B:
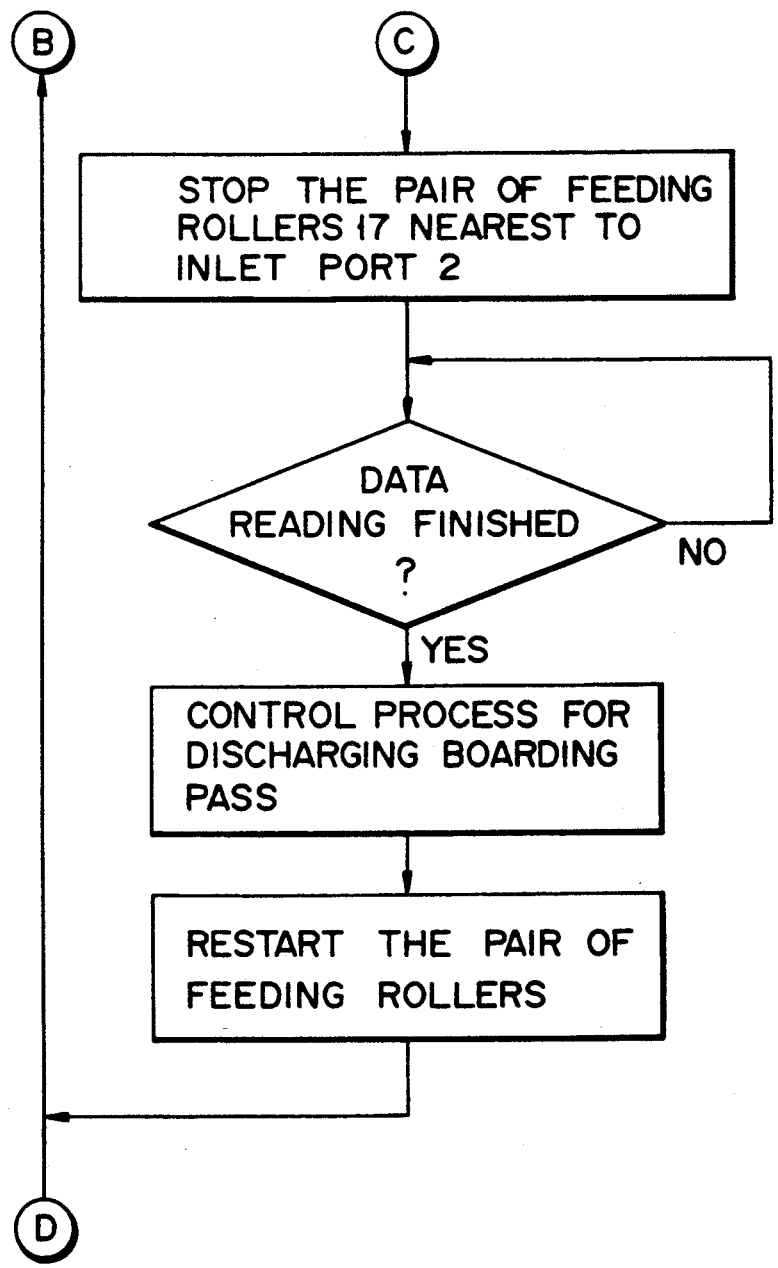
Figure 10C:
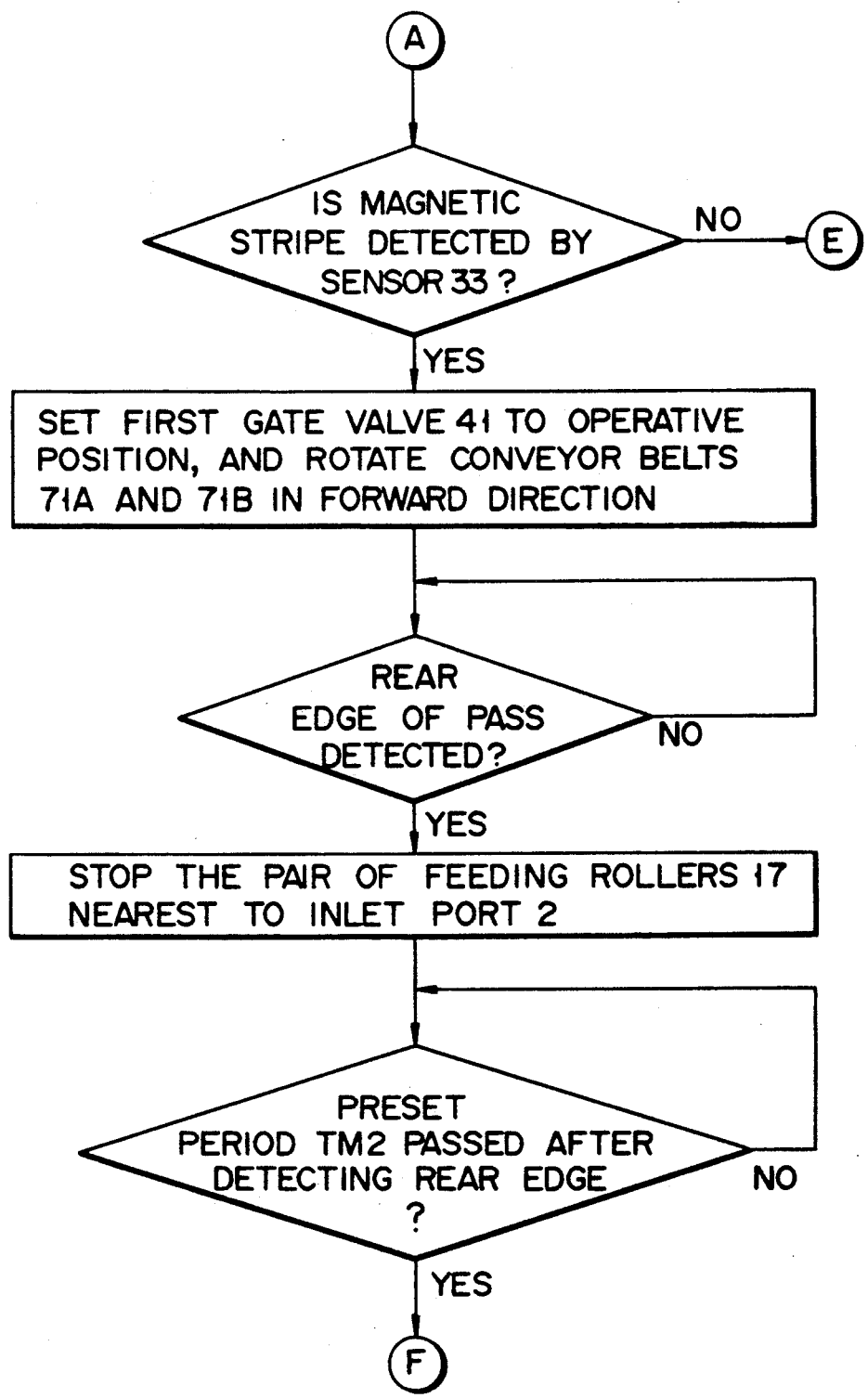
Figure 10D:
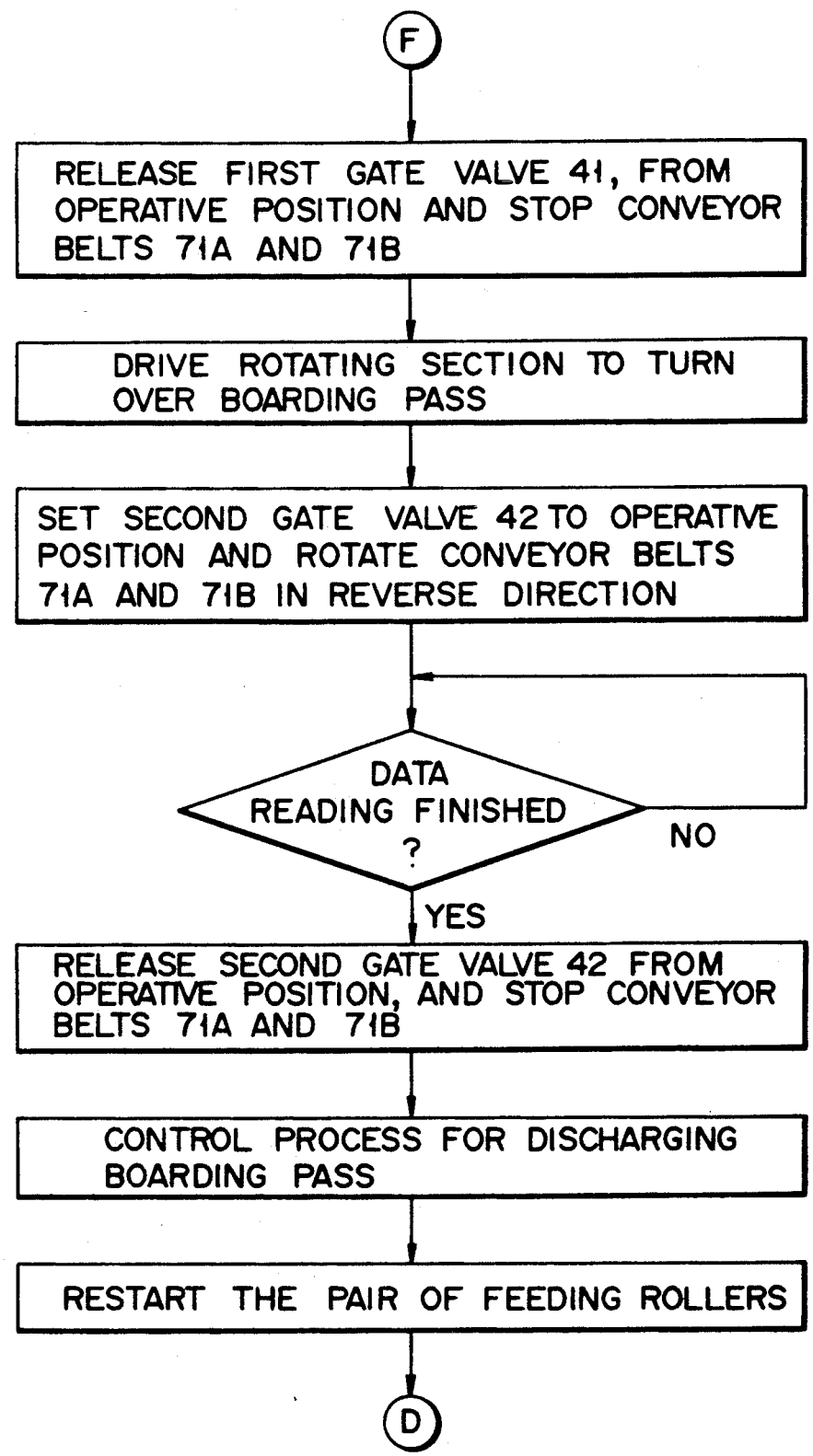
Figure 10E:
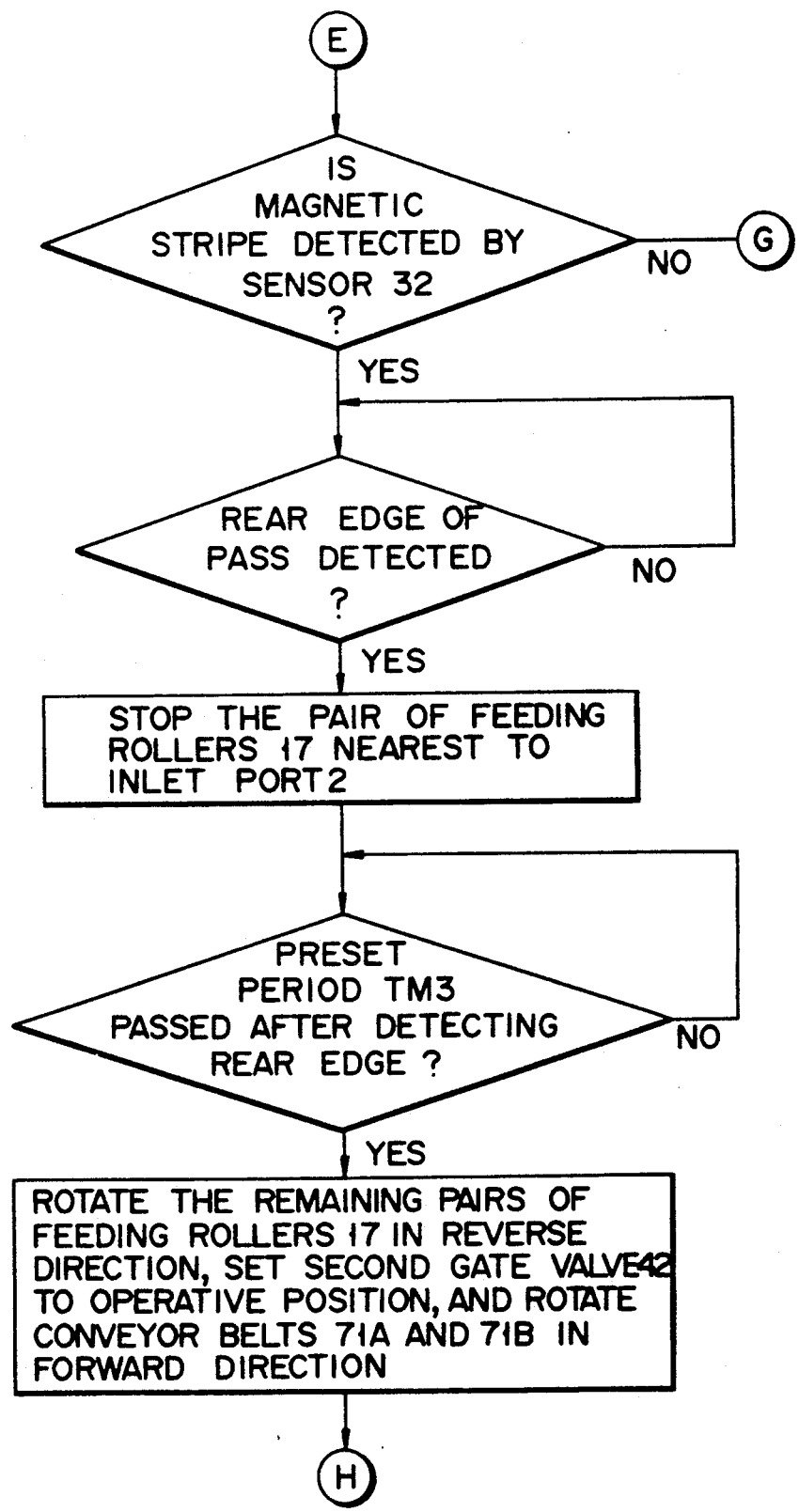
Figure 10F:
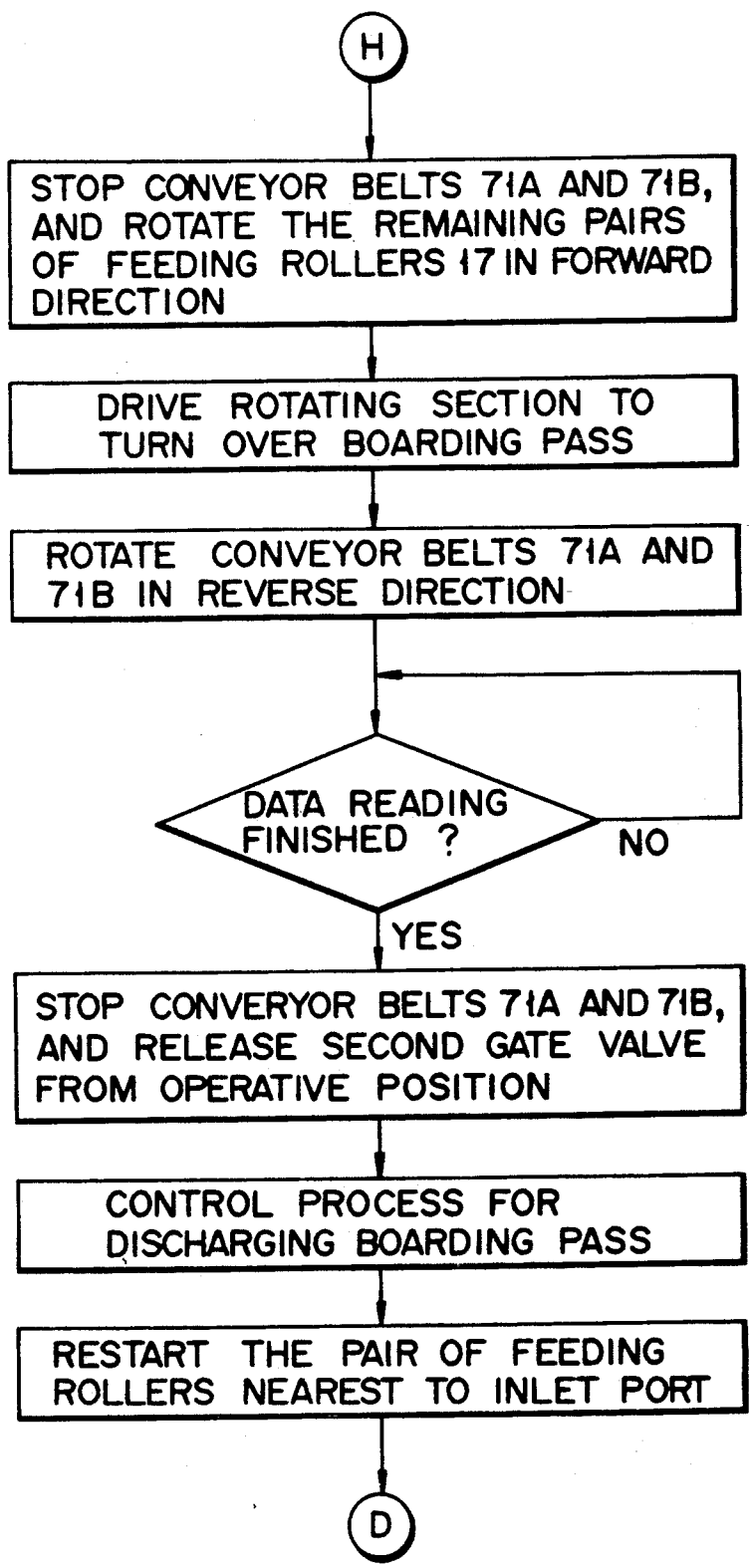
Figure 10G:
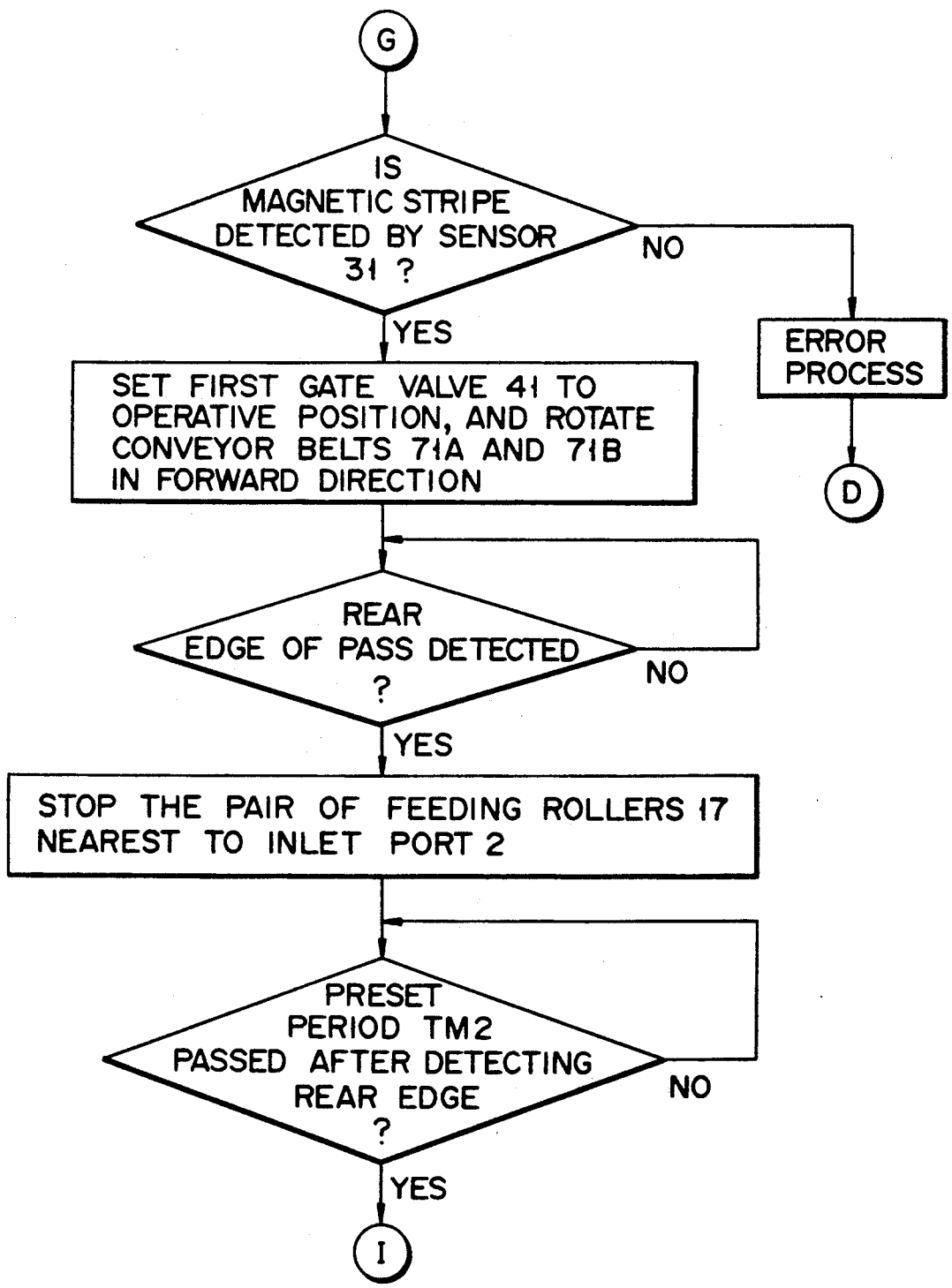

The boarding pass 19 is inserted into the inlet port 2 of the reading device in one of the orientations PT1 to PT4 shown in FIG. 9. The magnetic sensors 31, 32, 33 and 34 of the detecting section 30 generate detection signals when the boarding pass 19 is inserted in the orientations PT1 to PT4, respectively.

Upon application of power, the CPU 100 performs the control operation according to the flow shown in FIGS. 10A to 10H. After the control operation is started, the circuit elements are initialized, and a stand-by flag is set. Thereafter, the CPU 100 repeatedly checks whether the boarding pass 19 is inserted. When the boarding pass 19 is inserted in one of the orientations PT1 to PT4, the stand-by flag is checked to confirm that the pairs of feeding rollers 17 rotate in the forward direction, and then the orientation of the boarding pass 19 is checked. If the rotation of the feeding rollers 17 is not confirmed, they are driven to rotate in the forward direction and the stand-by flag is cleared. Further, if the boarding pass 19 has not been inserted for a preset period TMI after the previous insertion, the pairs of feeding rollers 17 are stopped and the stand-by flag is set.

In the case where the boarding pass 19 is inserted into the inlet port 2 in the correct orientation PT1, the magnetic strip of the boarding pass 19 is detected by the magnetic sensor 34. Then, the CPU 100 determines that the pass 19 is inserted in the correct orientation, and permits the boarding pass 19 to be transported through the main feeding path 21 and fed to the reading section 3. The pair of feeding rollers 17 nearest to the inlet port 2 are stopped when it is detected that the rear edge of the pass 19 has passed the detecting section 30, and are restarted when it is detected that the reading section 3 has finished reading data from the magnetic stripe of the boarding pass 19 fed from the feeding section 20.

In the case where the boarding pass 19 is inserted into the inlet port 2 in the orientation PT2 in which the front side is set face up and the passenger's stub 19a is set in the forward direction, the magnetic stripe of the boarding pass 19 is detected by the magnetic sensor 33. Then, the CPU 100 determines that the boarding pass 19 is inserted in the wrong orientation PT2. The CPU 100 instructs the direction changing section 40 to set the first gate valve 41 in the operative position, and instructs the sub-feeding section 70 to rotate conveyor belts 71A and 71B in the forward direction. As a result, the boarding pass 19 is guided from the feeding path 21 to the sub-feeding path 51. At this time, the boarding pass 19 is set in the sub-feeding path 51 with the reverse side facing the front plane 1a of the main body of the reading device. The pair of feeding rollers 17 nearest to the inlet port 2 is stopped when it is detected that the rear edge of the boarding pass 19 has passed the detecting section 30. Further, when it is detected that a preset period TM2 has passed after the detection of the rear edge of the pass 19, the first gate valve 41 is released from the operative position to the rest position, and the conveyor belts 71A and 71B are stopped. (The preset period TM2 equals a period in which the rear edge of the boarding pass 19 is required to move from the detecting section 30 to the top ends of the paper guides 52A and 52B.)

Thereafter, the CPU 100 instructs the rotating section 50 to turn over or rotate the paper guides 52A and 52B defining the sub-feeding path 51 around the on axis 53 by 180 degree. As a result, the boarding pass 19 is set with the front side thereof facing the front plane 1a of the main body of the reading device.

Next, the CPU 100 instructs the direction changing section 40 to set the second gate valve 42 to the operative position, and instructs the sub-feeding section 70 to rotate the conveyor belts 71A and 71B in the reverse direction. At this time, the boarding pass 19 is returned to the feeding path 21, and fed to the reading section in the correct orientation, in which the front side thereof is set face up and the airline-retained portion 19b is set facing the reading section 3. After the reading section 3 has finished reading data from the magnetic stripe of the boarding pass 19 fed from the feeding section 20, the second gate valve 42 is released from the operative position to the rest position, and the conveyor belts 71A and 71B are stopped. The pair of feeding rollers 17 nearest the inlet port 2 is restarted after the control process for discharging the boarding pass 19.

In the case where the boarding pass 19 is inserted into the inlet port 2 in the incorrect orientation PT3 in which the reverse side thereof is set to face up and the airline-retained portion 19b is set in the forward direction, the magnetic stripe is detected by the magnetic sensor 32. Then, the CPU 100 determines that the pass 19 is inserted in the wrong orientation PT3, and permits the boarding pass 19 to be transported through the main feeding path 21. The pair of feeding rollers 17 nearest to the inlet port 2 are stopped when it is detected that the rear edge of the boarding pass 19 has passed the detecting section 30. The CPU 100 instructs the feeding section 20 to rotate the remaining pair of feeding rollers 17 in the reverse direction, instructs the direction changing section 40 to set the second gate valve 42 to the operative position, and instructs the sub-feeding section 70 to rotate the conveyor belts 71A and 71B in the forward direction, when it is detected that a preset period TM3 has passed after the detection of the rear edge of the pass 19. (The preset period TM3 equals a period in which the rear edge of the boarding pass 19 is required to move from the detecting section 30 to the downstream entrance of the main feeding path 21.) At this time, the boarding pass 19 is moved downward along the rear portion of the first gate valve 41 and the second gate valve 42, and smoothly fed into the sub-feeding path 51 since the exit portion of the first gate valve 41 is formed in an arc configuration. When it is detected that a preset period TM4 has passed after the the change in the rotational direction of the remaining pairs of feeding rollers 17, the conveyor belts 71A and 71B are stopped, and the remaining pairs of feeding rollers 17 are rotated in the forward direction. (The preset period TM4 equals a period in which the rear edge of the boarding pass 19 is required to move from the downstream entrance of the feeding path 21 to the bottom ends of the paper guides 52A and 52B.) In this case, the pass 19 is set in the sub-feeding path 51 with the reverse side thereof facing the front plane 1a of the main body of the device.

Thereafter, the CPU 100 instructs the rotating section 50 to turn over the paper guides 52A and 52B defining the sub-feeding path 51. Then, the front side of the pass 19 is set facing the front plane 1a of the main body of the device. In this condition, the sub-feeding section 70 is further driven to rotate the conveyor belts 71A and 71B in the reverse direction. As a result, the boarding pass 19 is returned to the downstream of the main feeding path 21, and fed to the reading section 3 in the correct orientation. After the reading section 3 has finished reading data from the magnetic stripe of the boarding pass 19 fed from the rom the operative position to the rest position, and e conveyor belts 71A and 71B are stopped. The pair of feeding rollers 17 nearest to the inlet port 2 are restarted after the control process for discharging the boarding pass 19.

In a case where the boarding pass 19 is inserted into the inlet port 2 in the incorrect orientation PT4, in which the reverse side thereof is set face up and the airline-retained portion 19b is set in the forward direction, the magnetic stripe of the boarding pass 19 is detected by the magnetic sensor 31. Then, the CPU 100 determines that the pass 19 is inserted in the wrong orientation PT4. The CPU 100 instructs the direction changing section 40 to set the first gate valve 41 in the operative position, and instructs the sub-feeding section 70 to rotate conveyor belts 71A and 71B in the forward direction. As a result, the boarding pass 19 is guided from the feeding path 21 to the sub-feeding path 51. The pair of feeding rollers 17 nearest to the inlet port 2 are stopped when it is detected that the rear edge of the boarding pass 19 has passed the detecting section 30. Further, when it is detected that a preset period TM2 has passed after the detection of the rear edge of the pass 19, the first gate valve 41 is released from the operative position to the rest position, and the conveyor belts 71A and 71B are stopped. (The preset period TM2 equals a period in which the rear edge of the boarding pass 19 is required to move from the detecting section 30 to the top ends of the paper guides 52A and 52B.) At this time, the boarding pass 19 is set in the sub-feeding path 51 with the front side thereof facing the front plane 1a of the main body of the reading device.

Thereafter, the CPU 100 instructs the direction changing section 40 to set the second gate valve 42 to the operative position, and instructs the sub-feeding section 70 to rotate the conveyor belts 71A and 71B in the reverse direction. As a result, the boarding pass 19 is returned to the feeding path 21, and fed to the reading section in the correct orientation, in which the front side thereof is set face up and the airline-retained portion 19b is set facing the reading section 3. After the reading section 3 has finished reading data from the magnetic stripe of the boarding pass 19 fed from the feeding section 20, the second gate valve 42 is released from the operative position to the rest position, and the conveyor belts 71A and 71B are stopped. The pair of feeding rollers 17 nearest to the inlet port 2 are restarted after the control process for discharging the boarding pass 19.

As described above, in this embodiment, the inserted boarding pass 19 is normally fed to the reading section 3 through the main feeding path 21 by means of the feeding rollers 17. The orientation of the inserted boarding pass 19 is detected by checking which one of the magnetic sensors 31 to 34 has generated a detection signal, and if it is inserted in the wrong orientation, the boarding pass 19 is removed from the main feeding path 21 by means of the direction detecting section 40, rotated by the rotating section 50 if necessary, and is returned to the main feeding path 21 by means of the sub-feeding section 70. In this way, the control section 107 adequately controls the elements 20, 30, 40, 50 and 70 to automatically correct the orientation of the boarding pass 19 and supply the boarding pass 19 in the correct orientation even if the boarding pass 19 is inserted in any orientation.

In this case, the reading device does not require two or more reading heads 4 which are precision parts. Therefore, it is possible to solve a problem of an increase in the manufacturing cost and difficulty in reducing the size of the reading device caused by an increase in the number of the heads. Further, a single reading head 4 can be easily adjusted. In addition, a special process for compensating for the characteristics of the heads can be made unnecessary.

Further, in this embodiment, the control section 107 is required only to control the mechanical movements of the respective elements.

Additional advantages and modifications will readily occur to those skilled in the art. Therefore, the invention in its broader aspects is not limited to the specific details, and representative device shown and described herein. Accordingly, various modifications may be made without departing from the spirit or scope of the general inventive concept as defined by the appended claims and their equivalents.

What is claimed is:

1. A reading device comprising:
   a card inlet to which a card having an axis is inserted;
   reading means for reading data recorded on the card, said reading means being formed of a single reading head;
   transport means or transporting the cad from said card inlet to said reading means;
   rotation means for storing the card supplied thereto during transport, and rotating together with said card, said rotation means including two substantially parallel plates that re rotatable about the axis of the card and substantially parallel to a feed direction of said card in order to reorient said card; and
   control means for checking the orientation of the card inserted into said card inlet, for instructing said transport means to temporarily feed the card to said rotation means, and or instructing said rotation means to turn the card over when it is detected that the card has been inserted in a particular incorrect orientation, said control means including sensing means for sensing the position of a data bearing portion on th card inserted in said card inlet.

2. A reading device according to claim 1, wherein said rotation means is mounted so as to rotate around an axis extending along the moving direction of said card.

3. A reading device according to claim 2, wherein said transport means includes a feeding path formed between said card inlet and said reading means, feeding members formed to move the card through said feeding path and said rotation means, and gating means for selectively allowing the card to move between said feeding path and the rotation means.

4. A reading device according to claim 3, wherein said gating means includes a first gate valve selectively set to an operative position at which the card is guided from one of the upstream and downstream directions of said feeding path to said rotation means and a second gate valve selectively set to an operative position at which the card is guided from said rotation means to one of the upstream and downstream directions of said feeding path.

5. A reading device according to claim 4, wherein said control means includes means for detecting that the card is inserted into said card inlet in a correct orientation in which the front side is set face up and the front portion is set in the forward direction, and for controlling said feeding path so that the card is moved from said card inlet and fed to said reading means through said feeding path.

6. A reading device according to claim 5, wherein said control means includes means for detecting that the card is inserted in a first incorrect orientation in which the front side is set face up and the rear portion is set in the forward direction, and for controlling said first and second gate valves, feeding members, and rotation means so that the card is moved from said card inlet through the upstream direction of said feeding path to said rotation means, turned over in said rotation means, and then moved back to be fed to said reading means through the downstream direction of said feeding path.

7. A reading device according to claim 6, wherein said control means includes means for detecting that the card is inserted in a second incorrect orientation in which the reverse side is set face up and the front portion is set in the forward direction, and for controlling said first and second gate valves, feeding members, and rotation means so that the card is moved from said card inlet through the upstream and downstream directions of said feeding path to said rotation means, turned over in said rotation means, and then moved back to be fed to said reading means through the downstream direction of said feeding path.

8. A reading device according to claim 7, wherein said control means includes means for detecting that the card is inserted in a third incorrect orientation in which the reverse side is set face up and the rear portion is set in the forward direction, and for controlling said first and second gate valves and feeding members so that the card is fed from said card inlet through the upstream direction of said feeding path to said rotation means, and then moved back to be fed to said reading means through said downstream direction of said feeding path.

9. A reading device according to claim 3, wherein said gating means includes a first gate valve selectively set to an operative position at which the card is guided from one of the upstream and downstream directions of said feeding path to said storage path and a second gate valve selectively set to an operative position at which the card is guided from said storage path to one of the upstream and downstream directions of said feeding path.

10. A reading device according to claim 1, wherein said data bearing portion on the card comprises a magnetic stripe.

* * * * *